United States Patent [19]
Oono et al.

[11] Patent Number: 5,886,830
[45] Date of Patent: Mar. 23, 1999

[54] DRIVE APPARATUS FOR ZOOM LENS BARREL

[75] Inventors: Masahiro Oono, Saitama-ken; Hisao Iwanade, Tokyo; Noboru Saitoh, Saitama-ken; Koji Sato, Saitama-ken; Sukenori Shiba, Saitama-ken; Tatsuya Yoshida, Saitama-ken; Nobuyuki Nagai, Saitama-ken, all of Japan

[73] Assignee: Asahi Kogaku Kogyo Kabushiki Kaisha, Tokyo, Japan

[21] Appl. No.: 987,082

[22] Filed: Dec. 9, 1997

[30] Foreign Application Priority Data

Dec. 12, 1996 [JP] Japan .................................. 8-332074

[51] Int. Cl.⁶ .................................................. G02B 15/14
[52] U.S. Cl. ........................... 359/696; 359/699; 359/700
[58] Field of Search .................................... 359/696, 699, 359/700, 704

[56] References Cited

U.S. PATENT DOCUMENTS

| | | | |
|---|---|---|---|
| 3,918,910 | 11/1975 | Soya et al. .................................. | 422/66 |
| 4,179,191 | 12/1979 | Freudenschuss et al. .............. | 359/699 |
| 5,113,260 | 5/1992 | Morisawa ................................ | 358/225 |
| 5,266,992 | 11/1993 | Takaoka et al. ......................... | 354/199 |
| 5,485,236 | 1/1996 | Arai et al. ........................... | 354/195.11 |
| 5,687,029 | 11/1997 | Omi et al. ............................... | 359/700 |

FOREIGN PATENT DOCUMENTS 9-61695  3/1997  Japan .

OTHER PUBLICATIONS

An English text and drawings from counterpart U.S. App No. 08/316,472.

*Primary Examiner*—Georgia Epps
*Assistant Examiner*—Ricky Mack
*Attorney, Agent, or Firm*—Greenblum & Bernstein, P.L.C.

[57] ABSTRACT

A drive apparatus for a zoom lens barrel having at least two movable lens groups, one of which is used also as a focusing lens group, comprising a pair of lens frames which respectively hold the two movable lens groups, a pair of driven pins which are integrally provided on the lens frames, a drive cam plate which is provided with a pair of cam surfaces which engage with the corresponding driven pins and which is rotatable about an axis, a drive mechanism which includes a motor for driving the drive cam plate, and a detection mechanism which detects the angular position of the drive cam plate. One of the cam surfaces that corresponds to the movable lens group, other than the focusing lens group, is defined by a stepped cam surface having discrete sections which are adapted to set the focal length discretely, so that no movement of the movable lens group takes place in the range of the angular position of the drive cam plate corresponding to the discrete sections. The other cam surface that corresponds to the movable lens group that functions not only as the zooming lens group but also as the focusing lens group is defined by a continuous cam surface which is adapted to move the movable lens group continuously when the drive cam plate is rotated in accordance with the object distance. The stop position of the drive cam plate during the zooming operation and the angular position of the drive cam plate during the focusing operation is controlled by the detection mechanism of the angular position of the drive cam plate.

6 Claims, 14 Drawing Sheets

DRIVE APPARATUS FOR ZOOM LENS BARREL

BACKGROUND OF THE INVENTION

1. Field of the Invention

The present invention relates to a drive apparatus for a zoom lens barrel.

2. Description of the Related Art

A zoom lens includes at least two movable lens groups which are moved in predetermined directions upon zooming. In many zoom lenses, one of the two lens groups functions as a focusing lens group. In a conventional or classical drive mechanism which has been used particularly for a single lens reflex camera in which no focal shift during zooming is accepted, the movable zoom lens groups are moved along tracks defined by cam grooves formed on a cam ring so as not to cause the focal shift. The position of the focusing lens group, one of the two movable lens groups is controlled in accordance with the object distance upon focusing.

In another type of known drive mechanism for compact cameras or digital cameras in which it is necessary to correctly focus on an object at the time of shutter releasing, the movable zoom lens groups are moved upon zooming while permitting the focal shift, and thereafter the movable lens groups are moved to a focal position in accordance with set focal length data and set object distance data upon the shutter releasing.

In the conventional drive apparatuses, separate drive motors for the zooming operation and the focusing operation or for the two movable lens groups must be used. Moreover, it is necessary to provide a position detecting mechanism of the movable lens groups.

SUMMARY OF THE INVENTION

It is an object of the present invention to provide a new zoom lens drive apparatus in place of a classic drive apparatus using a cam ring, wherein, on one hand, the two movable lens groups are moved while keeping a predetermined relationship during the zooming operation and, on the other hand, one of the two movable lens groups, i.e., the focusing lens group is moved during the focusing operation and wherein the focusing operation and the zooming operation can be carried out by a single drive mechanism and using a single detection mechanism.

Another object of the present invention is to provide a drive apparatus for a zoom lens barrel having at least two movable lens groups, wherein the barrel body having the movable lens groups and the drive mechanism thereof are prepared as subassembly units, thus resulting in an easy assembling operation.

To achieve the object mentioned above, according to the present invention, there is provided a drive apparatus for a zoom lens barrel having at least two movable lens groups, one of which is used also as a focusing lens group, comprising a pair of lens frames which respectively hold the two movable lens groups, a pair of driven pins which are integrally provided on the lens frames, a drive cam plate which is provided with a pair of cam surfaces which engage with the corresponding driven pins and which is rotatable about an axis, a drive mechanism which includes a motor for driving the drive cam plate, and a detection mechanism which detects the angular position of the drive cam plate. One of the cam surfaces that corresponds to the movable lens group, other than the focusing lens group, is defined by a stepped cam surface having discrete sections which are adapted to set the focal length discretely, so that no movement of the movable lens group takes place in the range of the angular position of the drive cam plate corresponding to the discrete sections. The other cam surface that corresponds to the movable lens group that functions not only as the zooming lens group but also as the focusing lens group is defined by a continuous cam surface which is adapted to move the movable lens group continuously when the drive cam plate is rotated in accordance with the object distance. The stop position of the drive cam plate during the zooming operation and the angular position of the drive cam plate during the focusing operation is controlled by the detection mechanism of the angular position of the drive cam plate.

Preferably, the drive cam plate and the drive mechanism can be provided on a lens drive unit which is a subassembly separate from a barrel body which holds the movable lens groups and which is secured to the barrel body so that the driven pins projecting from the barrel body engage with the pair of cam surfaces of the drive cam plate. This makes it possible to provide a sub-assembly of the drive mechanism.

Preferably, the discrete sections of the cam surface is defined by arcs having different radii from the axis of the drive cam plate.

Preferably, said drive apparatus for a zoom lens barrel comprises a controller which controls the stop positions of the drive cam plate so that one of the discrete cam surfaces is always in contact with the driven pin corresponding to the discrete cam surfaces.

According to another aspect of the present invention, there is provided A drive apparatus for a zoom lens barrel having at least two movable lens groups, comprising a drive cam plate which is provided with a pair of cam surfaces which control the positions of said two movable lens group, whereby the drive cam plate is rotatable about an axis. One of the cam surfaces for one of the two movable lens groups is defined by a stepped cam surface having discrete sections which are adapted to set the focal length discretely; the other of the cam surfaces for the other two lens groups is defined by a continuous cam surface which is adapted to effect focusing. A detection mechanism is provided which detects the angular position of the drive cam plate.

The present disclosure relates to subject matter contained in Japanese Patent Application No.8-332074 (filed on Dec. 12, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 6:
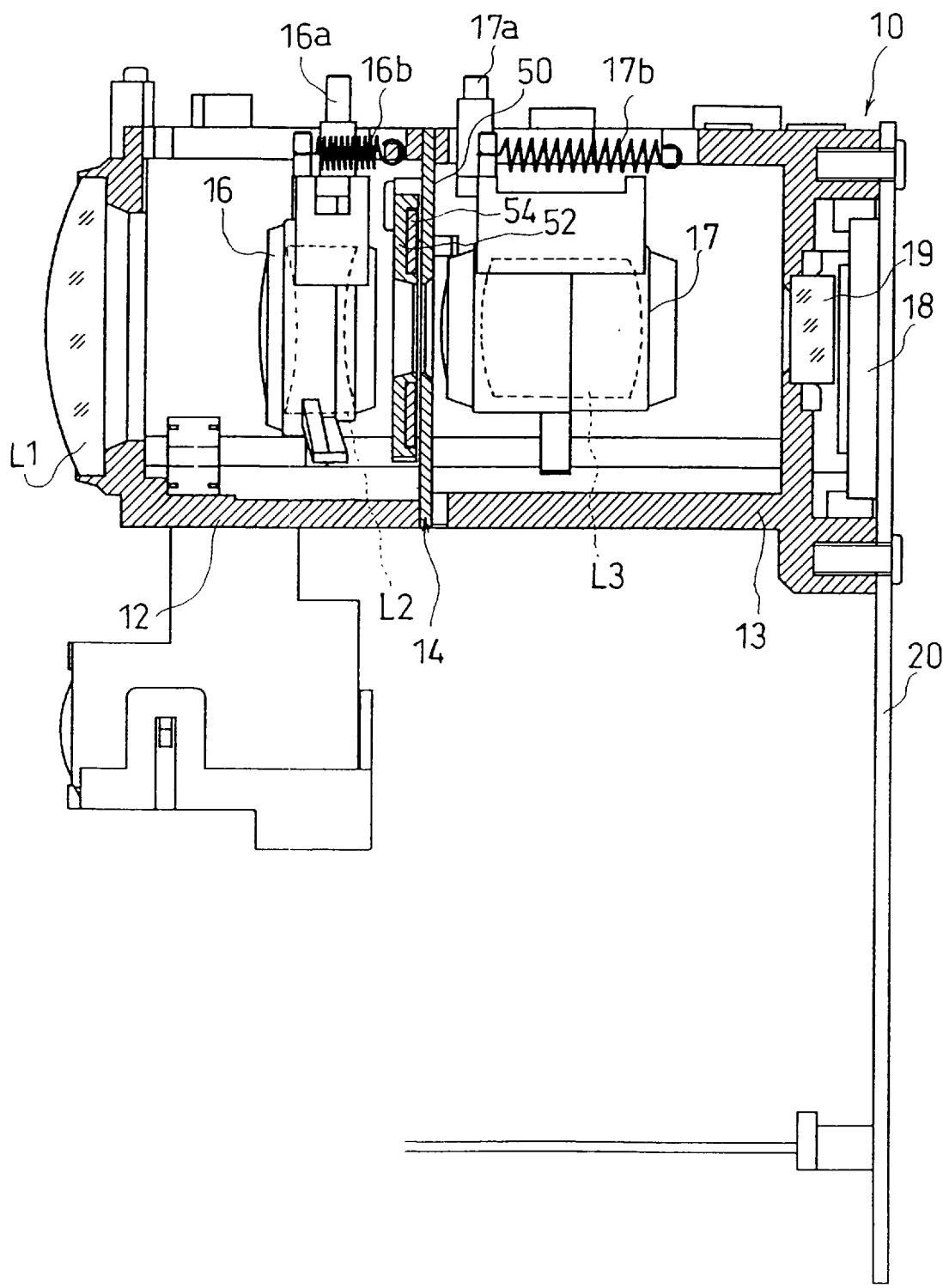
FIG. 6 is a longitudinal sectional view of FIG. 5, at a telephoto extremity.
Figure 7:
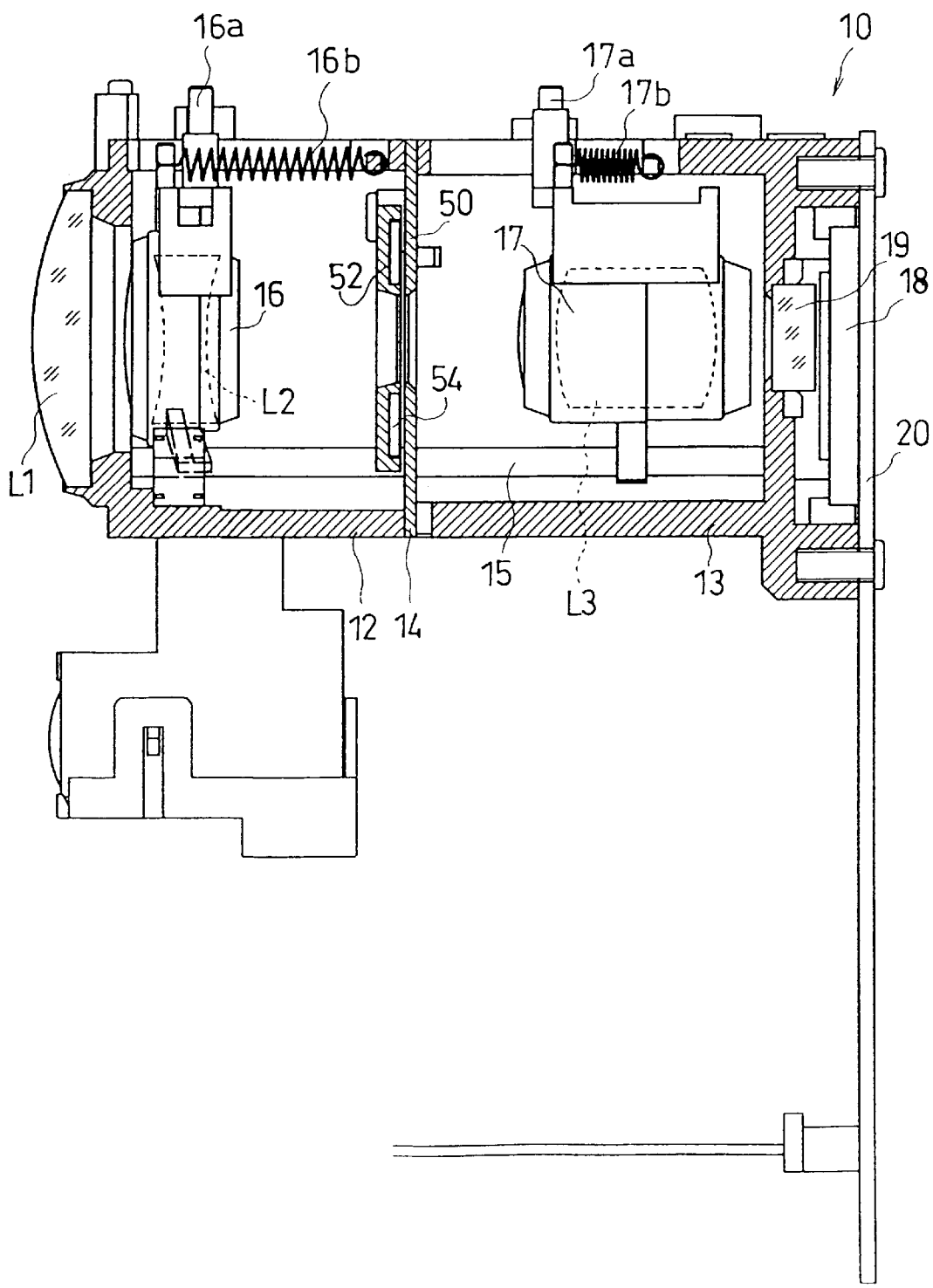
FIG. 7 is a longitudinal sectional view of FIG. 5, at a wide angle extremity.
Figure 8:
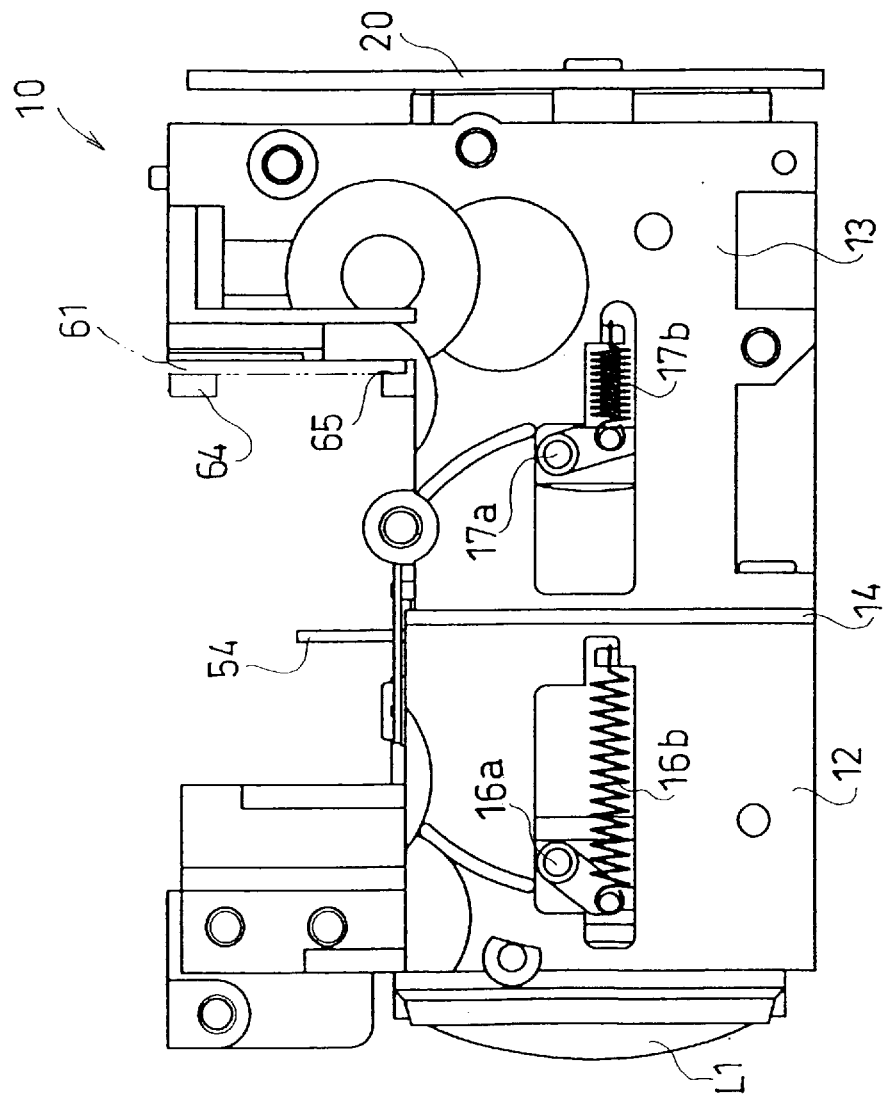
FIG. 8 is an end view viewed from the direction indicated by an arrow VIII in FIG. 5.

A zoom lens barrel according to an embodiment of the present invention is applied to a digital camera using a CCD. The zoom lens system is comprised of three lens groups consisting of a first stationary lens group L1 of positive power, a second movable lens group L2 of negative power, and a third lens group L3 of positive power, as shown in FIGS. 6 and 7. The zoom lens system constitutes a varifocal zoom lens in which magnification change (zooming) operation is carried out by moving the second and third lens groups L2 and L3, and the adjustment of the focal shift caused during the zooming operation and the focusing operation are carried out by moving the second lens group L2.

Figure 9:
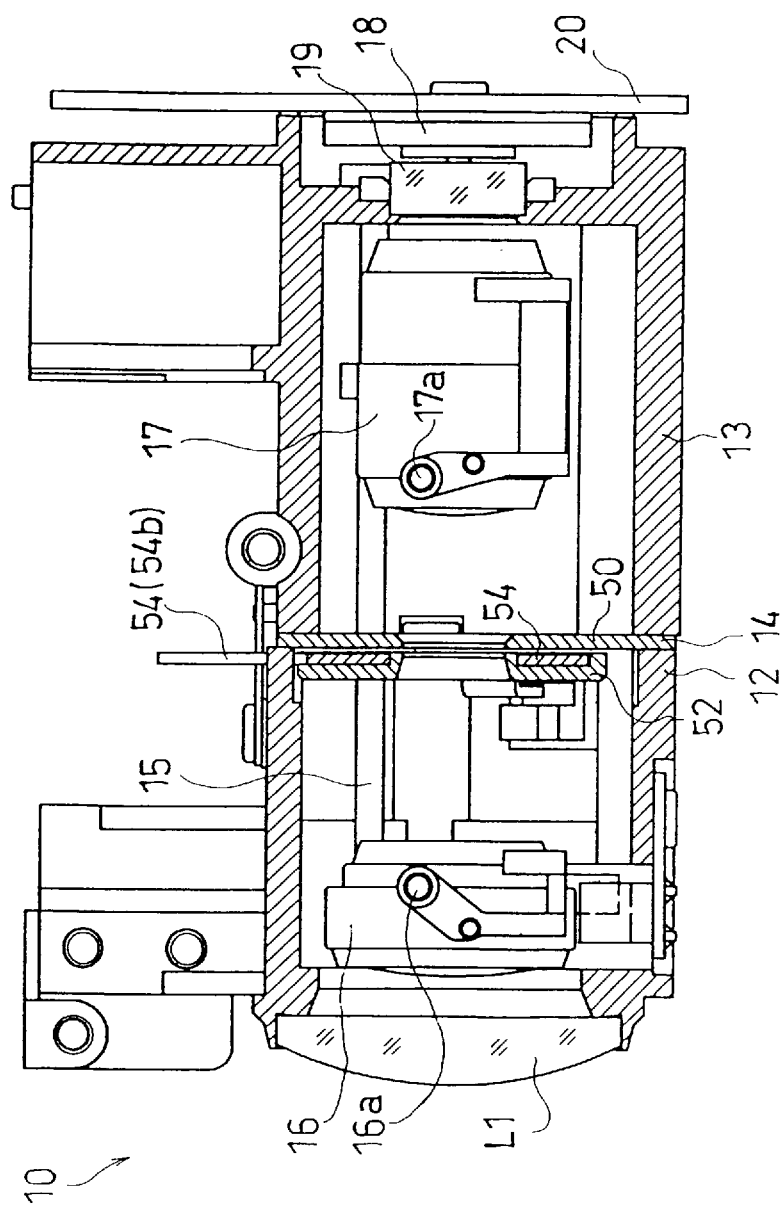
FIG. 9 is a cross sectional view of FIG. 8.

As shown in FIGS. 5 through 9, the lens barrel body 10 is essentially composed of a front plastic body 12, a rear plastic body 13, and a diaphragm block 14 held between the front and rear plastic bodies 12 and 13. A plurality of guide rods 15 (only one rod is shown in FIGS. 6, 7, 9) are provided extending between the front and rear bodies 12 and 13 in parallel with the optical axis. A second lens frame 16 which holds the second lens group L2 and a third lens frame 17 which holds the third lens group L3 are movable, guided by the guide rods 15. The CCD (image pickup device) 18 is provided behind the third lens frame 17 and is provided with a substrate 20 which is secured to the rear body 13. A crystal filter 19 is provided between the third lens frame 17 and the CCD 18.

The second lens frame 16 and the third lens frame 17 are respectively provided with second and third parallel lens pins (driven pins) 16a and 17a that extend upwardly. The second and third lens frames 16 and 17 are biased rearward (toward the CCD 18) by tensile springs 16b and 17b, respectively for removing a backlash.

As may be supposed from the telephoto position shown in FIG. 6 and the wide-angle position shown in FIG. 7, when the focal length varies from the telephoto extremity toward the wide-angle extremity, the second lens frame 16 (second lens group L2) is moved forward and the third lens frame 17 (third lens group L3) is moved rearward. Namely, when the focal length is changed, the second and third lens frames 16 and 17 (second and third lens groups L2 and L3) are moved in opposite directions.

The drive mechanism which drives the second lens frame 16 and the third lens frame 17 in the lens barrel body 10 is assembled as a lens drive unit 30 which is attached to bridge the front body 12 and the rear body 13. The lens drive unit 30 will be discussed below with reference to FIGS. 1 through 4.

Figure 1:
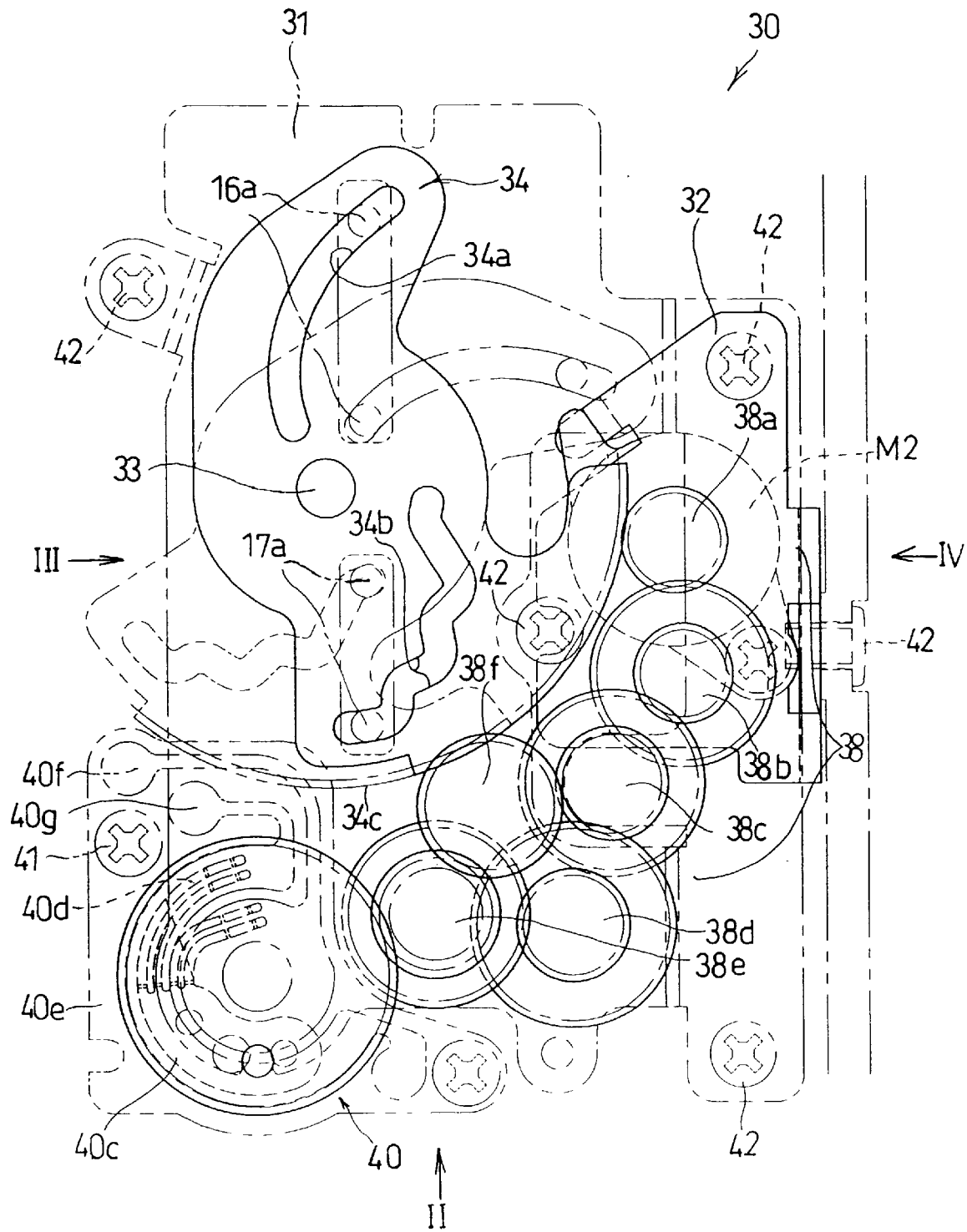
FIG. 1 is a plan view of an embodiment of a lens drive unit for a zoom lens barrel according to the present invention.
Figure 2:
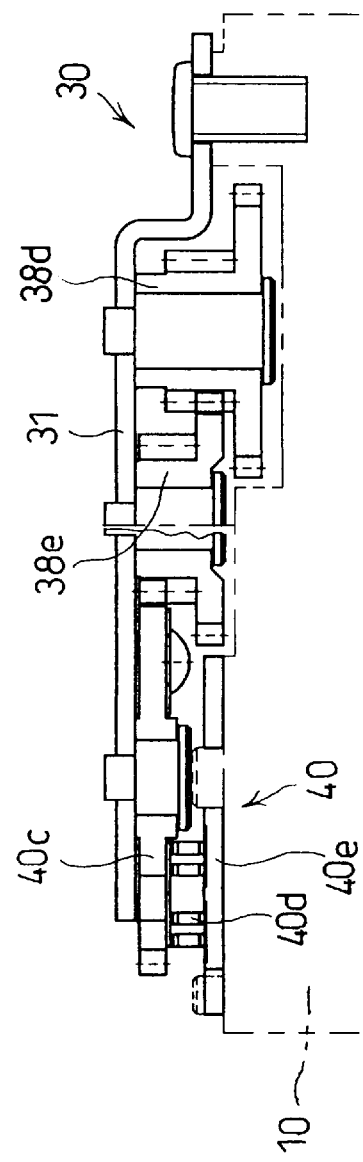
FIG. 2 is an end view viewed from the direction indicated by an arrow II in FIG. 1.
Figure 3:
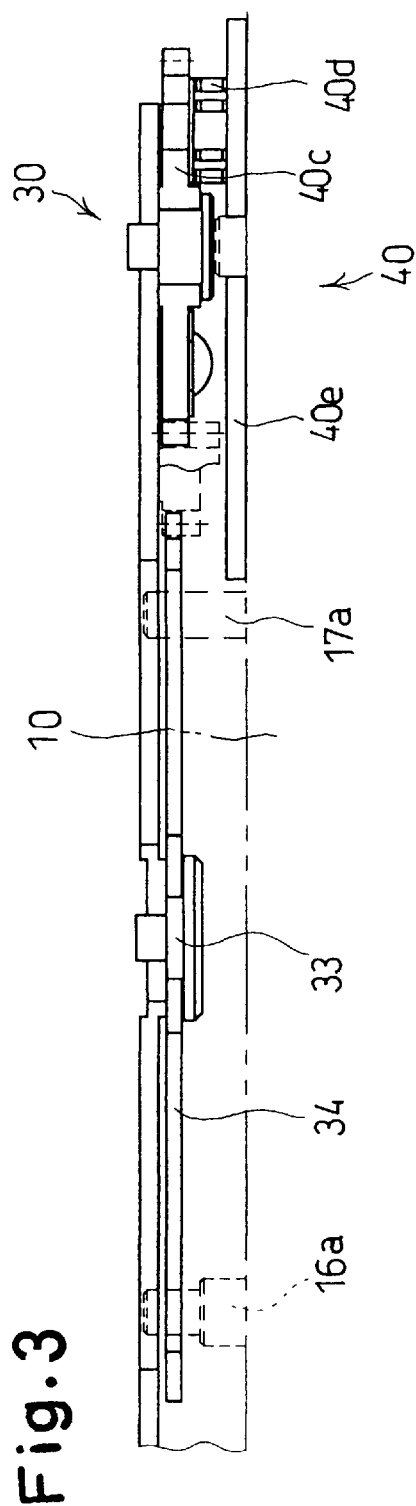
FIG. 3 is an end view viewed from the direction indicated by an row III in FIG. 1.
Figure 4:
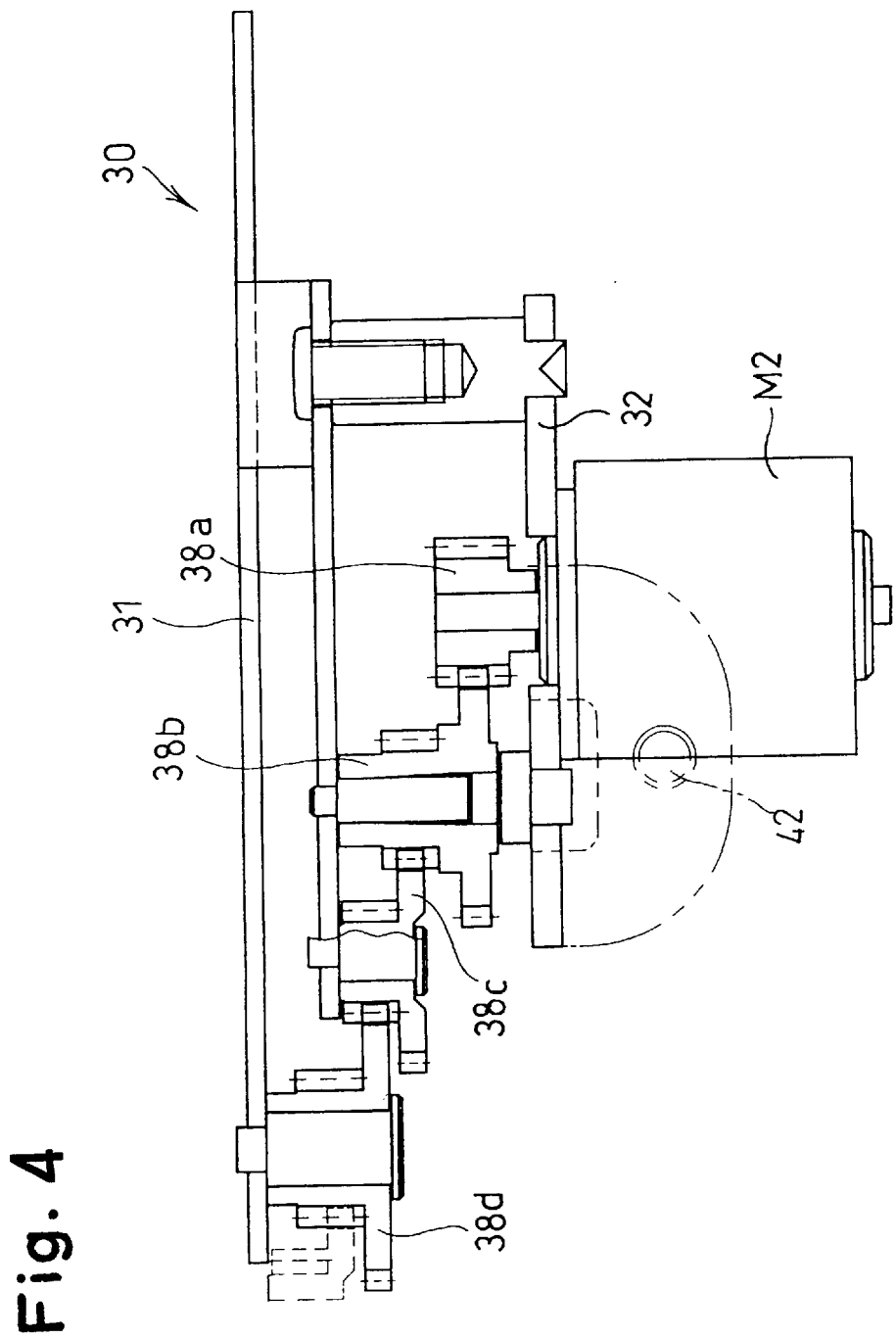
FIG. 4 is an end view viewed from the direction indicated by an arrow IV in FIG. 1.
Figure 5:
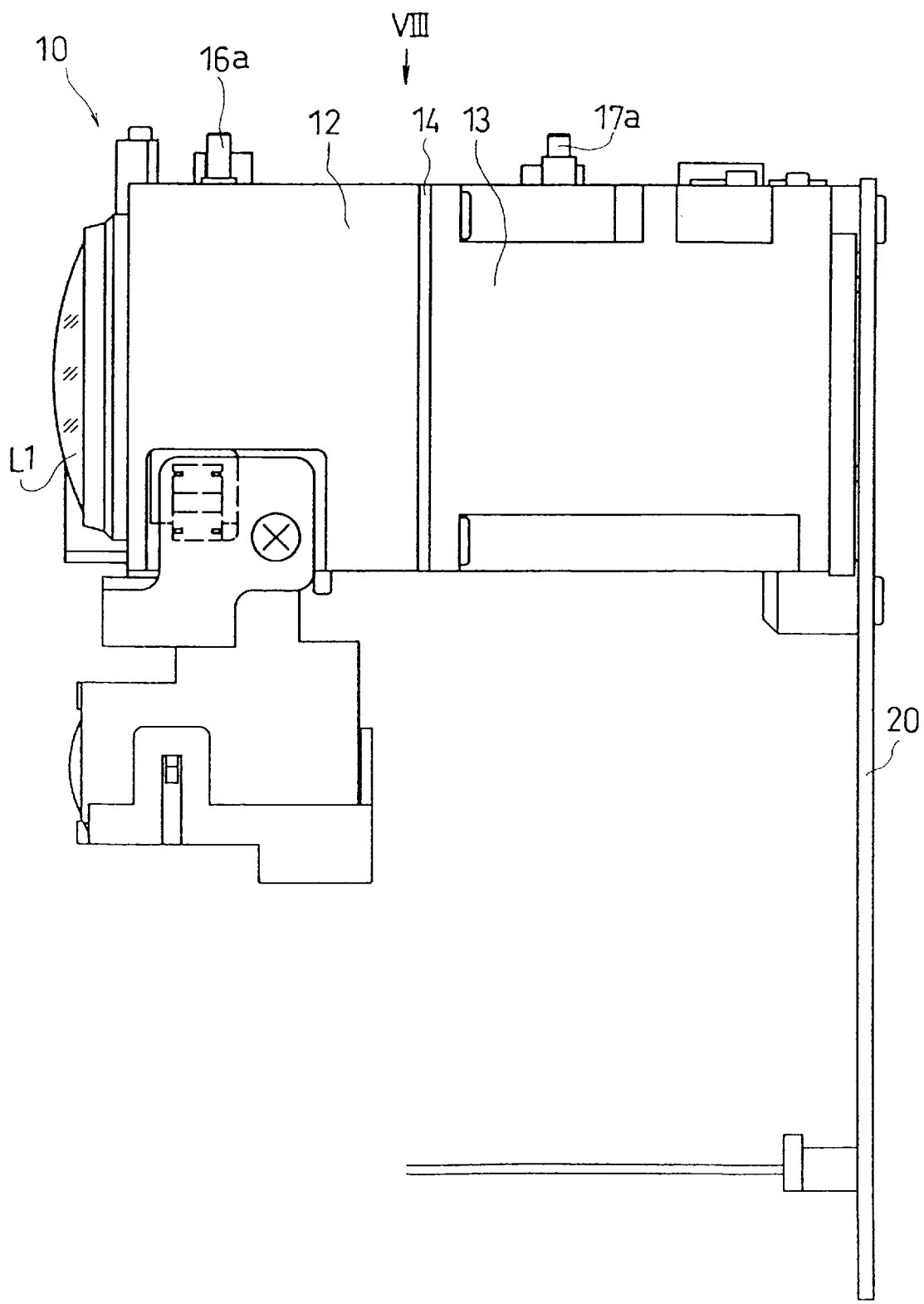
FIG. 5 is a left side view of a lens barrel body before a lens drive unit is incorporated therein.

The lens drive unit 30 is provided with first and second mother plates 31 and 32 which lie stepwise in different planes at different heights. In FIG. 1, for clarity, the upper first mother plate 31 is indicated by a dotted line and the lower second mother plate 32 is indicated by a solid line. The lens drive motor M2 is secured to the lower surface of the lower mother plate 32 so that the drive shaft of the motor M2 extends in a direction perpendicular to the lower mother plate. A drive cam plate 34 is pivoted to the first mother plate 31 through the shaft 33.

The drive cam plate 34 is provided with a pair of cam surfaces (cam grooves) 34a and 34b which engage with the second and third lens pins 16a and 17a, respectively. Since the second and third lens frames 16 and 17 are biased rearwardly by the tensile springs 16b and 17b, as mentioned above, the rear surfaces of the cam grooves 34a and 34b form the cam surface with which the second and third lens pins 16a and 17a always engage and the front surfaces of the cam grooves do not function as a cam surface.

Figure 15:
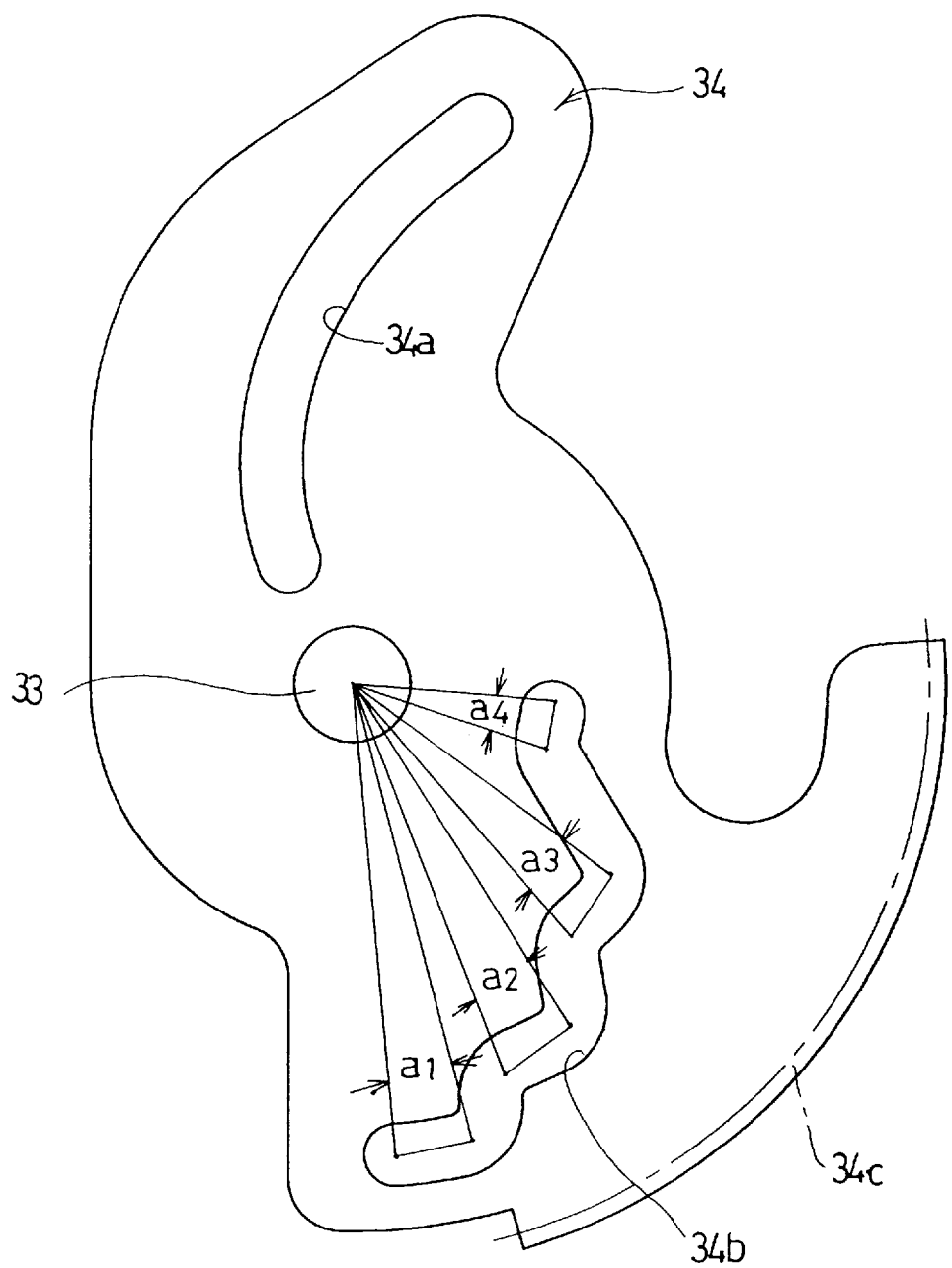
FIG. 15 is a plan view of a drive cam plate in a lens drive unit shown in FIG. 1.

The cam surface 34b for the third lens frame 17 is provided with a plurality of stepped sections (four sections in the illustrated embodiment) a1 through a4 (FIG. 15) which are defined by arcs whose center is located on the axis of the shaft 33 and which have different radii. The stepped sections a1 through a4 are connected by smooth curves. The cam surface 34a for the second lens frame 16 is defined by a continuously curved cam surface whose distance from the center axis of the shaft 33 is continuously changed.

The cam groove 34a for driving the second lens group L2 and the cam groove 34b for driving the third lens group L3 are located at opposite radial sides of the shaft 33, respectively, and the two lens groups are driven always in opposite directions by the cam grooves 34a and 34b, thereby reducing the size of the apparatus.

A gear mechanism 38 which transmits the rotation of the lens drive motor M2 to the drive cam plate 34, and a volume mechanism (variable resistor) 40 are provided between the first and second mother plates 31 and 32. A first gear 38a secured to the output shaft of the lens drive motor M2 is functionally connected to a sector gear 34c formed on the outer peripheral surface of the drive cam plate 34 through a second gear 38b, a third gear 38c, a fourth gear 38d, a fifth gear 38e and a sixth gear 38f. Each of the gears from the second gear 38b through to the fifth gear 40b are double gears having a pair of coaxial spur gears.

The fifth gear 38e is in mesh with the sixth gear 38f and the rotating brush gear 40c of the volume mechanism 40. The brush gear 40c is provided on the rear surface thereof with a brush 40d secured thereto. A resistor plate 40e is secured to the rear body (lens barrel body 10) separate from the lens drive unit 30 (before the lens drive unit 30 is secured), so that the resistor plate 40e is in contact with the brush 40d. The resistance between the two terminals 40f and 40g of the resistor plate 40e varies in accordance with the angular position of the brush gear 40c.

The shape of the cam surfaces 34a and 34b of the drive cam plate 34 is determined such that when the third lens pin 17a abuts against one of the stepped sections a1 through a4, a specific focal length is obtained based on the position of the third lens pin 17a (third lens group L3) and the position of the second lens pin 16a (the position of the second lens group L2). The position of the second lens pin 16a is determined in accordance with the position of the cam surface 34a. When the drive cam plate 34 rotates while one of the discrete sections a1 through a4 remains engaged with the third lens pin 17a, the cam surface 34a moves the second lens group L2 through the second lens pin 16a to thereby adjust the focus. For instance, when the third lens pin 17a is in contact with one end of the discrete sections a1 through a4, the lens is focused on an infinite object using the cam surface 34a, and when the drive cam plate 34 is rotated from the one end of the discrete sections a1 through a4 toward the other end of the discrete sections a1 through a4, the second lens group L2 is moved to focus on the closest object without moving the third lens group L3.

The angular displacement (angular position) of the drive cam plate 34 is detected and controlled by the volume mechanism 40. Specifically, when the lens drive motor M2 is driven, the drive cam plate 34 is rotated through the gear mechanism 38, and at the same time, the volume mechanism 40 is driven. When the zooming operation is carried out, the stop positions of the drive cam plate 34 is controlled so that one end of the discrete sections a1 through a4 of the cam surface 34b is always in contact with the third lens pin 17a. To control the stop positions, the angular displacement data of the drive cam plate 34 obtained by the volume mechanism 40 is used. When the drive cam plate 34 is rotated within one of the discrete sections a1 through a4 in accordance with the object distance data, the volume mechanism 40 detects and controls the rotation angle of the drive cam plate 34 in accordance with the object distance.

The lens drive unit 30 (except for the resistor plate 40e) as constructed above is formed as a unit separate from the lens barrel body 10 or the diaphragm block 14. The resistor plate 40e is secured to the rear body 13 by means of a plurality of screws 41 and is thereafter secured to the lens barrel body 10 (front body 12 and rear body 13) by means of a plurality of screws 42.

Figure 10:
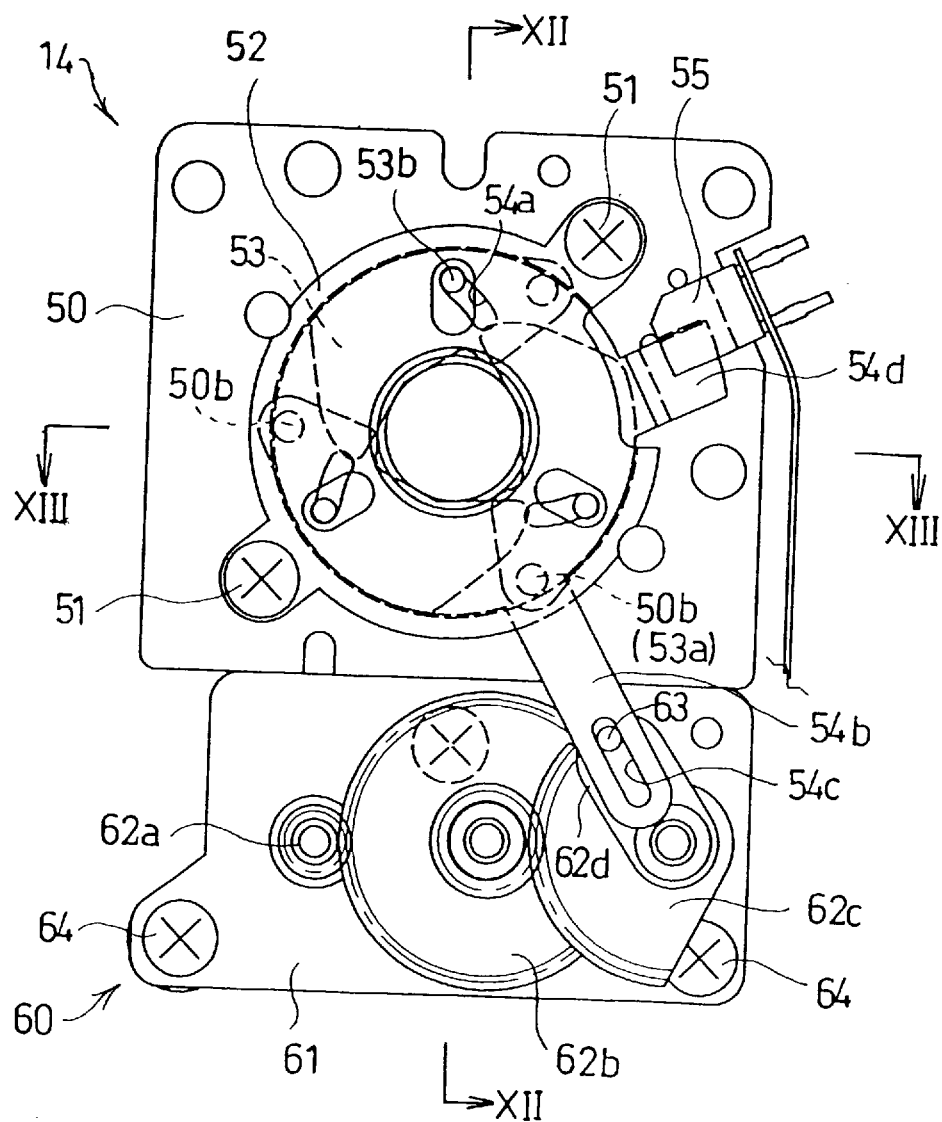
FIG. 10 is a front elevational view of a diaphragm drive unit in a full open aperture position.
Figure 11:
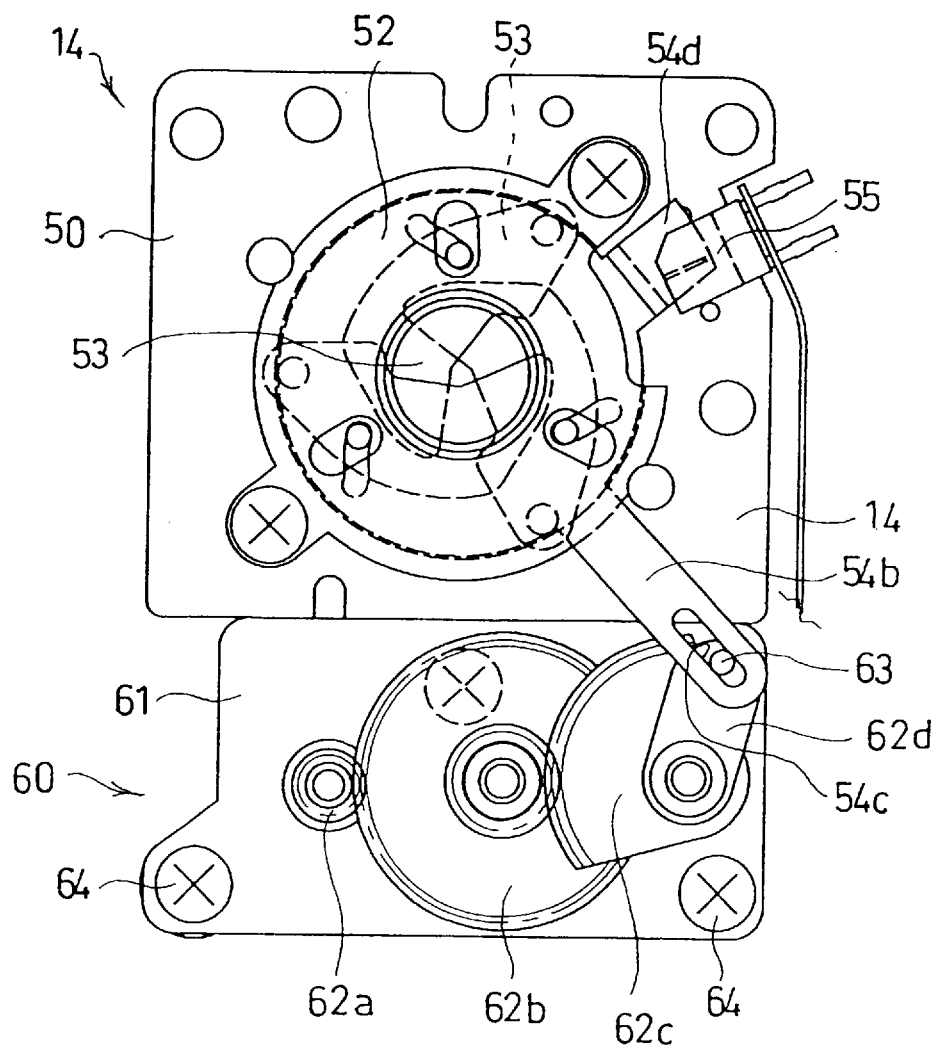
FIG. 11 is a front elevational view of diaphragm drive unit in a minimum aperture position.
Figure 12:
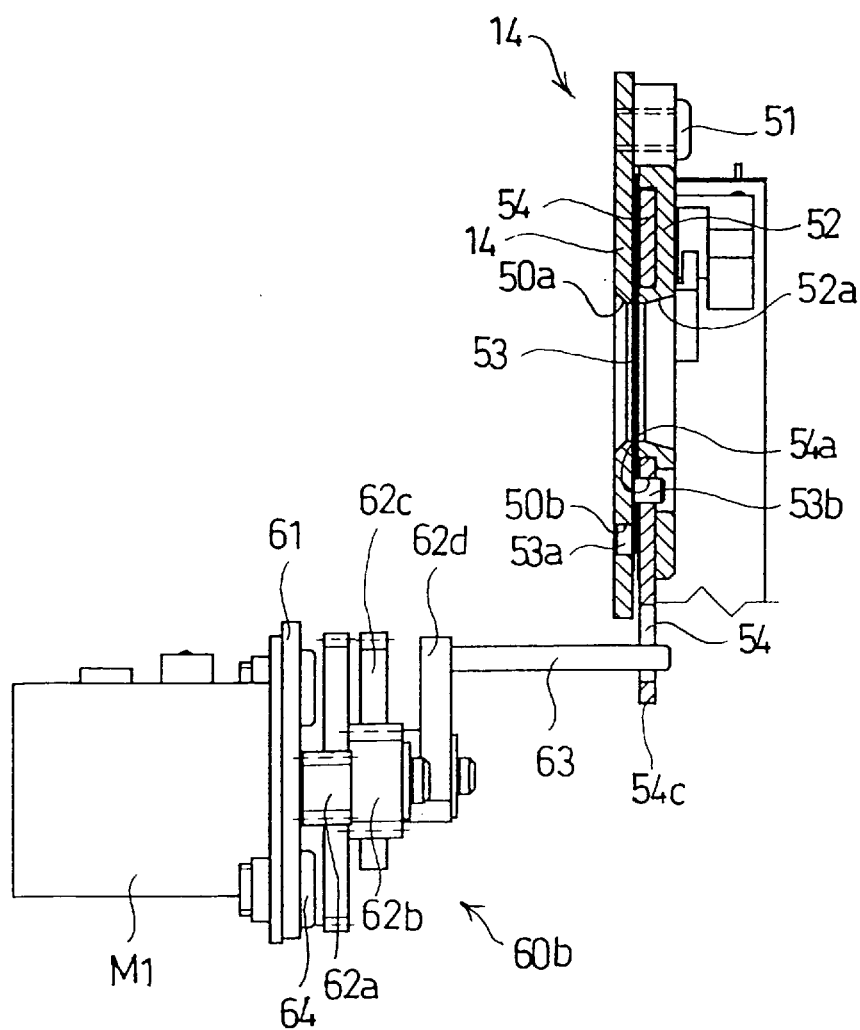
FIG. 12 is a sectional view taken along the line XII—XII in FIG. 10.
Figure 13:
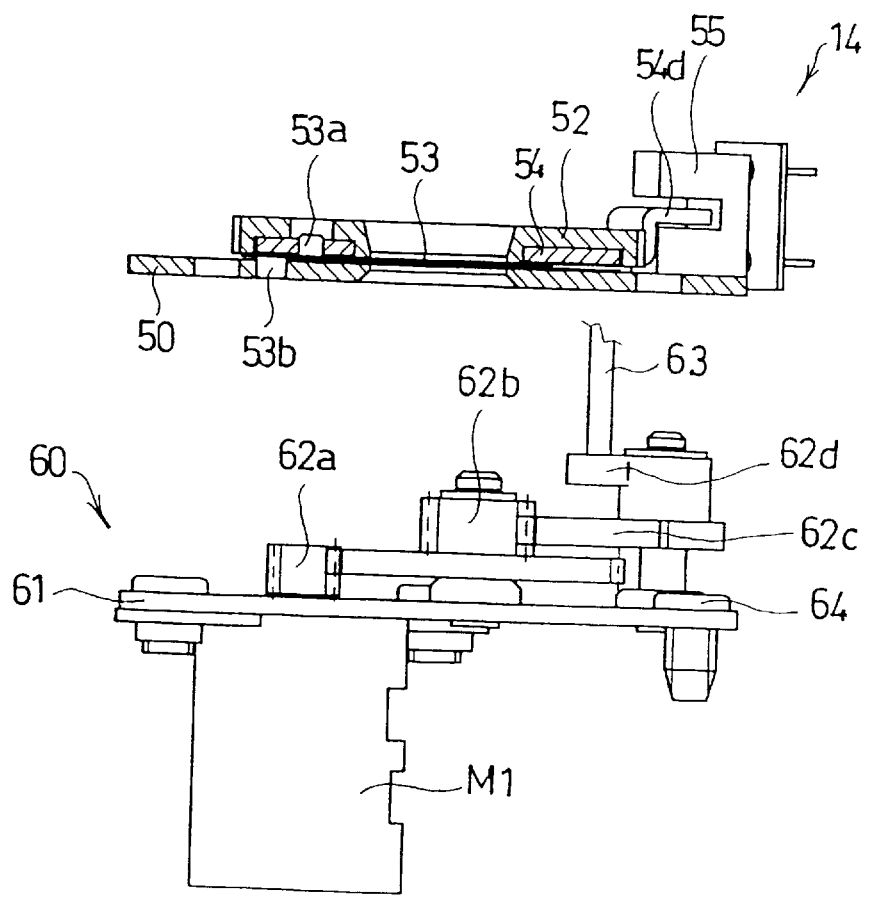
FIG. 13 is a sectional view taken along the line XIII—XIII in FIG. 10.

The diaphragm block 14 held between the front body 12 and the rear body 13 and the drive unit 60 of the diaphragm block 14 will be explained below with reference to FIGS. 10 through 12. A substrate 50 of the diaphragm block 14 and a retainer 52 which is secured to the diaphragm block 14 by screws 51 are provided with apertures 50a and 52a around the optical axis, respectively. The substrate 50 is provided with holes 50b formed around the aperture 50a, so that one of a pair of dowels 53b of diaphragm blades 53 are inserted in the holes 50b. An opening and closing ring 54 is rotatably provided between the substrate 50 and the retainer 52. The opening and closing ring 54 is provided with cam holes 54a in which the other dowels 53b of the diaphragm blades 53 are fitted. In the above-mentioned diaphragm mechanism which is per se known, when the opening and closing ring 54 is rotated, the size of the aperture defined by the blades 53 is varied between the full-open position (maximum aperture) shown in FIG. 10 and the smallest aperture (minimum aperture) shown in FIG. 11.

The opening and closing ring 54 is provided with a radially extending arm 54b which is in turn provided with a radially extending association groove 54c. The photodetector (origin sensor) 55 which detects the origin of the diaphragm mechanism is secured to the diaphragm block 14. The substrate 50 is provided with a dog 54d projecting therefrom, corresponding to the photodetector 55. In the illustrated embodiment, the full-open position of the diaphragm (aperture) corresponds to the origin so that the dog 54d interrupts light from the photodetector 55 to detect the origin. The set diaphragm value (angular displacement of the opening and closing ring 54) when the aperture size is reduced from the full-open position by the opening and closing ring 54 is fed from the lens controller 70 which controls the number of driving pulses of the diaphragm pulse motor M1.

The drive unit 60 as a separate unit is secured to the rear body 13 at a position different from the substrate 50 of the diaphragm block 14 in the optical axis direction and radial direction. The diaphragm pulse motor M1 is secured to the substrate 61 of the diaphragm drive unit 60. A first gear 62a secured to the output shaft of the diaphragm pulse motor M1 is connected to the sector gear 62c through a second gear 62b. The sector gear 62c is provided with a radial arm 62d integral therewith, which is in turn provided with an association pin 63 which is fitted in the radial association groove 54c of the opening and closing ring 54. The second gear 62b is a double gear having a pair of coaxial spur gears.

The diaphragm block 14 and the diaphragm drive unit 60 are each pre-assembled as a unit. The substrate 50 of the diaphragm block 14 is held and secured between the front and rear bodies 13 and 14. The substrate 61 of the diaphragm drive unit 60 is secured to the rear body 13 by means of a plurality of screws 64, in a state that the association pin 63 is fitted in the radial association groove 54c of the opening and closing ring 54 and one end of the substrate 61 is held in a holding groove 65 (FIG. 8) of the rear body 13.

Figure 14:
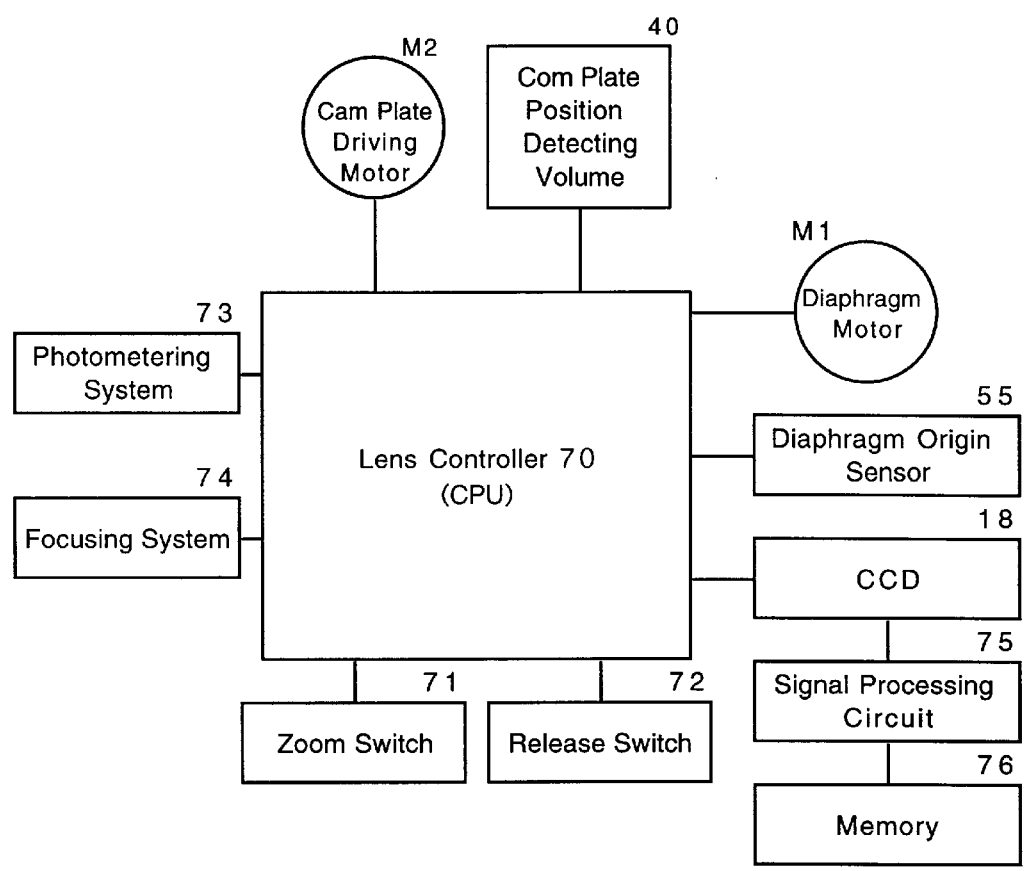
FIG. 14 is a block diagram of a control system in a zoom lens barrel according to the present invention.

FIG. 14 shows a control system of the zoom lens barrel. Connected to the lens controller (CPU) 70 is the diaphragm pulse motor M1, the lens drive motor M2, the volume mechanism 40, the diaphragm origin sensor 55, the CCD 18, a zoom switch 71, a release switch 72, a photometering system 73, an object distance detecting device 74 and an EEPROM. In general, the CCD 18 can constitute the photometering system 73. The object distance detecting device 74 can be either of a passive type or an active type. In the embodiment illustrated in FIGS. 1 through 3, the object distance detecting device 74 is a passive type. Image data formed on the CCD 18 is converted to an electric signal which is stored in the memory 76 through the signal processing circuit 75.

The basic operation of the zoom lens barrel constructed as above operates as follows.

At the wide-angle extremity shown in FIG. 7, if the zoom switch 71 is operated toward the wide-angle position, the drive cam plate 34 is rotated through the lens drive motor M2 and the gear mechanism 38. Consequently, the second lens frame 16 (second lens group L2) and the third lens frame (third lens group L3) are moved along predetermined tracks through the cam surfaces 34a and 34b. When the zoom switch 71 is released, the drive cam plate 34 whose angular position has been detected by the volume mechanism 40 is stopped in the state that the third lens pin 17a is in contact with one end of the discrete sections a1 through a4.

When the release switch 72 is depressed by half a step, the photometering system 73 and the object distance detecting device 74 are activated to obtain brightness data and object distance data. When the release switch 72 is depressed by a full step, the image pickup operation by the CCD 18 is carried out. Before the release switch 72 is fully depressed, the diaphragm value is set, in accordance with the object brightness data detected by the photometering system 73, by means of the diaphragm pulse motor M1, the diaphragm origin sensor 55 and the lens controller (CPU) 70. Moreover, the drive cam plate 34 is rotated in accordance with the object distance data detected by the distance detecting device 74 by means of the lens drive motor M2 and the gear mechanism 38. The rotation of the drive cam plate 34 is carried out while the third lens pin 17a remains located within one of the discrete sections a1 through a4 of the cam surface 34b. The angular displacement of the drive cam plate 34 is controlled by the volume mechanism 40 in accordance with the object distance data, so that the second lens group L2 can be moved to the in-focus position.

According to the present invention, the zooming operation in which the two movable lens groups are moved and the focusing operation in which one of the movable lens groups is moved are carried out by the single drive mechanism and using the single detection mechanism. Thus, a simple drive apparatus can be provided.

What is claimed is:

1. A drive apparatus for a zoom lens barrel having at least two movable lens groups, one of which is used also as a focusing lens group, comprising:

a pair of lens frames which respectively hold the two movable lens groups;

a pair of driven pins which are integrally provided on the lens frames;

a drive cam plate which is provided with a pair of cam surfaces which engage with the corresponding driven pins, said drive cam plate being rotatable about an axis;

a drive mechanism which includes a motor for driving the drive cam plate; and a detection mechanism which detects the angular position of the drive cam plate;

wherein one of the cam surfaces that corresponds to one of the movable lens groups, other than the focusing lens group, is defined by a stepped cam surface having discrete sections which are adapted to set the focal length discretely, so that no movement of the movable lens group takes place in the range of the angular position of the drive cam plate corresponding to each of the discrete sections;

the other cam surface that corresponds to the other movable lens groups which function not only as the zooming lens group but also as the focusing lens group is defined by a continuous cam surface which is adapted to move the other movable lens group continuously when the drive cam plate is rotated in accordance with the object distance;

the stop positions of the drive cam plate during the zooming operation and the rotation angle of the drive cam plate during the focusing operation are controlled by the detection mechanism of the angular position of the drive cam plate.

2. A drive apparatus for a zoom lens barrel according to claim 1, wherein the drive cam plate and the drive mechanism are provided on a lens drive unit which is a sub-assembly separate from a barrel body which holds the movable lens groups, said lens drive unit being secured to the barrel body so that the driven pins projecting from the barrel body engage with the pair of cam surfaces of the drive cam plate.

3. An apparatus for a zoom lens barrel according to claim 2, wherein said pair of cam surfaces formed on the cam plate are located at opposite radial sides of the central shaft, said cam surfaces being such that said two movable zoom lens groups are driven always in opposite directions by the rotation of the cam plate.

4. A drive apparatus for a zoom lens barrel according to claim 1, said discrete sections of the cam surface being defined by arcs having different radii from the axis of the drive cam plate.

5. A drive apparatus for a zoom lens barrel according to claim 1, further comprising a controller which controls the stop positions of the drive cam plate so that one of the discrete cam surfaces is always in contact with the driven pin corresponding to the discrete cam surfaces.

6. A drive apparatus for a zoom lens barrel having at least two movable lens groups, comprising:

a drive cam plate which is provided with a pair of cam surfaces which control the positions of said two movable lens groups, said drive cam plate being rotatable about an axis;

one of the cam surfaces for one of the two movable lens group being defined by a stepped cam surface having discrete sections which are adapted to set the focal length discretely, the other of the cam surfaces for the other two lens groups being defined by a continuous cam surface which is adapted to effect focusing; and a detection mechanism which detects the angular position of the drive cam plate.

* * * * *

UNITED STATES PATENT AND TRADEMARK OFFICE
CERTIFICATE OF CORRECTION

PATENT NO. : 5,886,830
DATED : March 23, 1999
INVENTOR(S) : M. OONO et al.

It is certified that error appears in the above-identified patent and that said Letters Patent is hereby corrected as shown below:

On the printed patent cover, at paragraph [56], line 5 (column 1, line 24), References Cited, U.S. Patent Documents, "5,113,260" should be — 5,113,261—.

At column 8, line 35 (claim 6, line 8) of the printed patent, "group" should be —groups—.

Signed and Sealed this

Fourth Day of April, 2000

Attest:

Q. TODD DICKINSON

*Attesting Officer*    *Director of Patents and Trademarks*